(12) United States Patent
Duan et al.

(10) Patent No.: US 9,514,216 B2
(45) Date of Patent: *Dec. 6, 2016

(54) AUTOMATIC CLASSIFICATION OF SEGMENTED PORTIONS OF WEB PAGES

(71) Applicant: Yahoo! Inc., Sunnyvale, CA (US)

(72) Inventors: Lei Duan, San Jose, CA (US); Fan Li, Redwood City, CA (US); Srinivas Vadrevu, Milpitas, CA (US); Emre Velipasaoglu, San Francisco, CA (US); Swapnil Hajela, Fremont, CA (US); Deepayan Chakrabarti, Austin, TX (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,528

(22) Filed: Sep. 8, 2014

(65) Prior Publication Data

US 2015/0066934 A1 Mar. 5, 2015

Related U.S. Application Data

(63) Continuation of application No. 12/538,776, filed on Aug. 10, 2009, now Pat. No. 8,849,725.

(51) Int. Cl.
*G06F 17/30* (2006.01)
*G06F 15/18* (2006.01)
(Continued)

(52) U.S. Cl.
CPC ........ *G06F 17/30598* (2013.01); *G06F 15/18* (2013.01); *G06F 17/30873* (2013.01);
(Continued)

(58) Field of Classification Search
None
See application file for complete search history.

(56) References Cited

U.S. PATENT DOCUMENTS 6,300,947 B1 10/2001 Kanevsky
6,556,217 B1 4/2003 Makipaa et al.
(Continued)

OTHER PUBLICATIONS

Debnath et al, "Automatic Identification of Informative Sections of Web Pages", IEEE Transactions on Knowledge and Data Engineering, vol. 17, No. 9, Sep. 2005.*
(Continued)

*Primary Examiner* — Stanley K. Hill
*Assistant Examiner* — Ilya Traktovenko
(74) *Attorney, Agent, or Firm* — Berkeley Law & Technology Group, LLP (57) ABSTRACT

Exemplary methods and apparatuses are provided which may be used for classifying and indexing segmented portions of web pages and providing related information for use in information extraction and/or information retrieval systems. In an embodiment, an index of segmented portions may be used by a search engine to respond to a search query. In an embodiment, one or more machine learned models may be used to identify one or more feature properties of a plurality of segmented portions within one or more files, or otherwise inferable from the one or more files. In an embodiment, one or more machine learned models may be used to classify one or more of a plurality of segmented portions as being at least one of a plurality of segment types.

20 Claims, 5 Drawing Sheets

(51) Int. Cl.
  *G06K 9/62* (2006.01)
  *G06N 5/04* (2006.01)
  *G06N 99/00* (2010.01)
  *G06Q 10/10* (2012.01)

(52) U.S. Cl.
  CPC ............ *G06K 9/6256* (2013.01); *G06N 5/04* (2013.01); *G06N 99/005* (2013.01); *G06Q 10/10* (2013.01)

(56) References Cited

U.S. PATENT DOCUMENTS

| | | | |
|---|---|---|---|
| 7,065,707 | B2 | 6/2006 | Chen et al. |
| 7,853,871 | B2 | 12/2010 | Simons et al. |
| 7,900,149 | B2 | 3/2011 | Hatcher et al. |
| 8,255,793 | B2 | 8/2012 | Chakrabarti et al. |
| 8,849,725 | B2 * | 9/2014 | Duan et al. ............ 706/12 |
| 2002/0016801 | A1 | 2/2002 | Reiley et al. |
| 2002/0099739 | A1 | 7/2002 | Fischer |
| 2003/0050931 | A1 | 3/2003 | Herman et al. |
| 2003/0236917 | A1 | 12/2003 | Gibbs et al. |
| 2004/0095400 | A1 | 5/2004 | Anderson et al. |
| 2004/0103371 | A1 | 5/2004 | Chen et al. |
| 2005/0195221 | A1 | 9/2005 | Berger et al. |
| 2006/0149726 | A1 | 7/2006 | Ziegert et al. |
| 2006/0161543 | A1 | 7/2006 | Feng et al. |
| 2006/0167857 | A1 | 7/2006 | Kraft et al. |
| 2006/0230100 | A1 | 10/2006 | Shin et al. |
| 2006/0282758 | A1 | 12/2006 | Simons et al. |
| 2007/0083810 | A1 | 4/2007 | Scott et al. |
| 2008/0094420 | A1 | 4/2008 | Geigel et al. |
| 2008/0307328 | A1 | 12/2008 | Hatcher et al. |
| 2009/0083677 | A1 | 3/2009 | Darwish et al. |
| 2010/0228738 | A1 | 9/2010 | Mehta et al. |
| 2010/0312728 | A1 | 12/2010 | Feng et al. |

OTHER PUBLICATIONS

Liu et al, "Towards Building Logical Views of Websites", Data & Knowledge Engineering—Special issue: WIDM 2002, vol. 49 Issue 2, May 2004.*
Xu et al, "Extracting Precise Link Context Using NLP Parsing Technique", Proceedings of the IEEE/WIC/ACM International Conference on Web Intelligence (WI'04), Publication Year: 2004, pp. 64-69.*
Krupl et al, "Using Visual Cues for Extraction of Tabular Data from Arbitrary HTML Documents", WWW2005, May 10-14, 2005, Chiba, Japan.*
Vedeshin, "Advanced Information Retrieval from Web Pages", BCS IRSG Symposium: Future Directions in Information Access (FDIA 2007).*
U.S. Appl. No. 12/538,776, filed Aug. 10, 2009, 67 Pages.
U.S. Appl. No. 12/538,776 / Filing Receipt, Mailed Aug. 21, 2009, 3 Pages.
U.S. Appl. No. 12/538,776 / Notice of Publication, Mailed Feb. 10, 2011, 1 Page.
U.S. Appl. No. 12/538,776 / Non-Final Rejection, Mailed May 7, 2012, 16 Pages.
U.S. Appl. No. 12/538,776 / Amendment/Req. Reconsideration—After Non-Final Reject, Mailed Sep. 6, 2012, 18 Pages.
U.S. Appl. No. 12/538,776 / Final Rejection, Mailed Sep. 20, 2012, 12 Pages.
U.S. Appl. No. 12/538,776 / Response After Final Action, Mailed Nov. 20, 2012, 14 Pages.
U.S. Appl. No. 12/538,776 / Advisory Action (PTOL-303), Mailed Nov. 28, 2012, 4 Pages.
U.S. Appl. No. 12/538,776 / Request for Continued Examination (RCE), Mailed Jan. 22, 2013, 14 Pages.
U.S. Appl. No. 12/538,776 / Non-Final Rejection, Mailed Apr. 22, 2013, 15 Pages.
U.S. Appl. No. 12/538,776 / Amendment/Req. Reconsideration—After Non-Final Reject, Mailed Aug. 22, 2013, 14 Pages.
U.S. Appl. No. 12/538,776 / Final rejection, Mailed Oct. 3, 2013, 25 Pages.
U.S. Appl. No. 12/538,776 / Request for Continued Examination (RCE), Mailed Jan. 3, 2014, 16 Pages.
U.S. Appl. No. 12/538,776 / Notice of Allowance and Fees Due (PTOL-85), Mailed Jan. 24, 2014, 5 Pages.
U.S. Appl. No. 12/538,776 / Notice of Allowance and Fees Due (PTOL-85), Mailed Apr. 18, 2014, 5 Pages.
U.S. Appl. No. 12/538,776 / Notice of Allowance and Fees Due (PTOL-85), Mailed May 16, 2014, 9 Pages.
U.S. Appl. No. 12/538,711, filed Aug. 10, 2009, 60 Pages.
U.S. Appl. No. 12/538,711 / Transmittal Letter, filed Aug. 25, 2009, 3 Pages.
U.S. Appl. No. 12/538,711 / Filing Receipt, mailed Dec. 2, 2009, 3 Pages.
U.S. Appl. No. 12/538,711 / Notice of Publication, Mailed Feb. 10, 2011, 1 Page.
U.S. Appl. No. 12/538,711 / Non-Final Rejection, Mailed Sep. 13, 2011, 12 Pages.
U.S. Appl. No. 12/538,711 / Informal or Non-Responsive Amendment, Mailed Dec. 13, 2011, 12 Pages.
U.S. Appl. No. 12/538,711 / Notice to the Applicant regarding a non-compliant or non-responsive amendment, Mailed Dec. 19, 2011, 3 Pages.
U.S. Appl. No. 12/538,711 / Amendment/Req. Reconsideration—After Non-Final Reject, Mailed Feb. 17, 2012, 12 Pages.
U.S. Appl. No. 12/538,711 / Final Rejection, Mailed Mar. 28, 2012, 15 Pages.
U.S. Appl. No. 12/538,711 / Request for Continued Examination (RCE), Mailed Jun. 28, 2012, 14 Pages.
U.S. Appl. No. 12/538,711 / Non-Final Rejection, Mailed Sep. 13, 2012, 15 Pages.
U.S. Appl. No. 12/538,711 / Amendment/Req. Reconsideration—After Non-Final Reject, Mailed Dec. 13, 2012, 14 Pages.
U.S. Appl. No. 12/538,711 / Non-Final Rejection, Mailed Apr. 1, 2013, 13 Pages.
U.S. Appl. No. 12/538,711 / Amendment/Req. Reconsideration—After Non-Final Reject, Mailed Jul. 1, 2013, 10 Pages.
U.S. Appl. No. 12/538,711 / Final Rejection, Mailed Sep. 19, 2013, 16 Pages.
U.S. Appl. No. 12/538,711 / Response After Final Action, Mailed Nov. 19, 2013, 11 Pages.
U.S. Appl. No. 12/538,711 / Request for Continued Examination (RCE), Mailed Mar. 18, 2014, 16 Pages.
U.S. Appl. No. 12/538,711 / Non-Final Rejection, Mailed Mar. 26, 2014, 15 Pages.
U.S. Appl. No. 12/538,711 / Non-Final Office Action response, filed Jun. 25, 2014, 3 pages.
U.S. Appl. No. 12/538,711 / Examiner's Search, mailed Jul. 16, 2014, 14 pages.
U.S. Appl. No. 12/538,711 / Non-Final Rejection, mailed Jul. 16, 2014, 16 pages.
U.S. Appl. No. 12/538,711 / Req Reconsideration and Amendments after Non-Final, filed Sep. 30, 2014, 13 pages.
U.S. Appl. No. 12/538,711 / Final Rejection, mailed Jan. 26, 2015, 17 pages.
U.S. Appl. No. 11/971,160 / Oath or Declaration as Filed on Jan. 8, 2008, 48 Pages.
U.S. Appl. No. 11/971,160 / Filing Receipt, Mailed Jan. 28, 2008, 3 Pages.
U.S. Appl. No. 11/971,160 / Transmittal Letter, Mailed May 13, 2008, 4 Pages.
U.S. Appl. No. 11/971,160 / Notice of Publication, Mailed Jul. 9, 2009, 1 Page.
U.S. Appl. No. 11/971,160 / Non-Final Rejection, Mailed Mar. 15, 2011, 16 Pages.
U.S. Appl. No. 11/971,160 / Amendment/Req. Reconsideration—After Non-Final Reject, Mailed Jul. 11, 2011, 23 Pages.
U.S. Appl. No. 11/971,160 / Non-Final Rejection, Mailed Sep. 29, 2011, 17 Pages.

(56) References Cited

OTHER PUBLICATIONS

U.S. Appl. No. 11/971,160 / Amendment/Req. Reconsideration—After Non-Final Reject, Mailed Dec. 23, 2011, 23 Pages.
U.S. Appl. No. 11/971,160 / Final Rejection, Mailed Feb. 24, 2012, 15 Pages.
U.S. Appl. No. 11/971,160 / Response After Final Action, Mailed Apr. 24, 2012, 7 Pages.
U.S. Appl. No. 11/971,160 / Notice of Allowance and Fees Due (PTOL-85), Mailed Apr. 30, 2012, 6 Pages.
U.S. Appl. No. 11/971,160 / Issue Fee Payment (PTO-85B), Mailed Jul. 24, 2012, 1 Page.
U.S. Appl. No. 11/971,160 / Issue Notification, Mailed Aug. 8, 2012, 1 Page.
Baluja, "Browsing on Small Screens: Recasting Web-Page Segmentation into an Efficient Machine Learning Framework", International World Wide Web Conference, WWW 2006, May 23-26, 2006, Edinburgh, Scotland.
Baluja, Shumeet, "Browsing on Small Screens: Recasting Web-Page Segmentation into an Efficient Machine Learning Framework", International World Wide Web Conference Committee, 2006, 10 pages.
Cai, et al. "Block-based Web Search", SIGIR '04, Sheffield, South Yorkshire, UK, Jul. 25-29, 2004, 8 pages.
Cai, Deng et al., "VIPS:A Vision-based Page Segmentation Algorithm", Microsoft Corporation, Nov. 2003, Technical Report MSR-TR-2003-79, 29 pages.
Chen, Jinlin, et al., "Function based Object Model Towards Website Adaption", Microsoft Research China, WWW10, May 2001, ACM, 13 pages.
Cheng, "Design and Realization of Advertisement Promotion Based on the Content of Webpage", KSEM 2007, LNAI 4798, pp. 502-507, 2007, Springer-Verlag Berlin Heidelberg 2007.
Cho et al, "Estimating Frequency of Change", ACM Transactions of Internet Technology, vol. 3, No. 3, Aug. 2003, pp. 256-290.
Douglis et al, "Rate of Change and other Metrics; a Live Study of the World Wide Web", USITS'97, USENIX Symposium on Internetworking Technologies and Systems, Dec. 1997.
Kao, Hung-Yu, et al., "WISDOM: Web Intrapage Informative Structure Mining based on Document Object Model", IEEE Transactions on Knowledge and Data Engineering, vol. 17, No. 5, May 2005, 14 pages.
Santini, "Automatic Genre Identification; Towards a Flexible Classification Scheme", BCS IRSG Symposium; Future Directions in Information Access—FDIA 2007, teaches confidence measure.
Song, et al. "Learning Block Importance Models for Web Pages", WWW 2004, New York, NY, May 17-22, 2004, pp. 203-211.
Song, et al. "Learning Important Models for Web Page Blocks based on Layout and Content Analysis", SIGKDD Explorations, vol. 6, issue 2, Dec. 2004, pp. 14-23.
Vadrevu, Srinivas, et al., "Semantic Partitioning of Web Pages", Springer Verlag Heidelberg, 2005, 12 pages.
Xiao, et al, "A Comparative Study on Classifying the Functions of Web Page Blocks", CIKM '06, Arlington, Virginia, Nov. 5-11, 2006, 2 pages.
Zou, Jie, et al., "Combining DOM Tree and Geometric Layout Analysis for Online Medical Journal Article Segmentation", ACM, JCDL, 2006 10 pages.

* cited by examiner

AUTOMATIC CLASSIFICATION OF SEGMENTED PORTIONS OF WEB PAGES

RELATED PATENT APPLICATIONS

This patent application is related to co-pending U.S. patent application Ser. No. 11/971,160, filed Jan. 8, 2008, titled "Automatic Visual Segmentation of WebPages", and which is incorporated by reference herein.

This patent application is related to co-pending U.S. patent application Ser. No. 12/538,711, filed Aug. 10, 2009, titled "Segment Sensitive Query Matching of Documents", and which is incorporated by reference herein.

BACKGROUND

Field

The subject matter disclosed herein relates to data processing.

Information

Data processing tools and techniques continue to improve. Information in the form of data is continually being generated or otherwise identified, collected, stored, shared, and analyzed. Databases and other like data repositories are common place, as are related communication networks and computing resources that provide access to such information.

The Internet is ubiquitous; the World Wide Web provided by the Internet continues to grow with new information seemingly being added every second. To provide access to such information, tools and services are often provided which allow for the copious amounts of information to be searched through in an efficient manner. For example, service providers may allow for users to search the World Wide Web or other like networks using search engines. Similar tools or services may allow for one or more databases or other like data repositories to be searched.

With so much information being available, there is a continuing need for methods and apparatuses that allow for relevant information to be identified and presented in an efficient manner.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Some exemplary methods and apparatuses are described herein that may be used for classifying and indexing segmented portions of one or more displayed web pages, the results of which may be used by a search engine or other like tool to determine how to respond to a search query and/or perform other data processing functions. More specifically, as illustrated in the example implementations described herein, a learner function (e.g., employing machine learning techniques) may be trained and used to establish one or more machine learned model(s). Such machine learned model(s) may be used by a classifier function to classify segmented portions of one or more displayable web pages. Certain information associated with such classified segmented portions may be used by the classifier function and/or an indexer function to establish and/or maintain an index. Such index may be implemented for use with a search engine that is responsive to search queries.

Before describing some example methods and apparatuses in greater detail, the sections below will first introduce certain aspects of an exemplary computing environment in which information searches may be performed. It should be understood, however, that techniques provided herein and claimed subject matter are not limited to these example implementations. For example, techniques provided herein may be adapted for use in a variety of information processing environments, such as, e.g., database applications, etc.

The Internet is a worldwide system of computer networks and is a public, self-sustaining facility that is accessible to tens of millions of people worldwide. Currently, the most widely used part of the Internet appears to be the World Wide Web, often abbreviated "WWW" or simply referred to as just "the web". The web may be considered an Internet service organizing information through the use of hypermedia. Here, for example, the HyperText Markup Language (HTML) may be used to specify the contents and format of a hypermedia document (e.g., a data file, a web page).

Unless specifically stated, a data file such as an electronic or web document refers to source code and/or any other data that may be accessed and processed in some manner to establish, render, and/or otherwise display a particular web page. Each web page may contain embedded references to images, audio, video, other web documents, etc. One common type of reference used to identify and locate resources on the web is a Uniform Resource Locator (URL).

In the context of the web, a user may "browse" for information by following references that may be embedded in each of the documents, for example, using hyperlinks provided via the HyperText Transfer Protocol (HTTP) or other like protocol.

Through the use of the web, individuals may have access to millions of pages of information. However, because there is so little organization to the web, at times it may be extremely difficult for users to locate the particular pages that contain the information that may be of interest to them. To address this problem, a mechanism known as a "search engine" may be employed to index a large number of web pages and provide an interface that may be used to search the indexed information, for example, by entering certain words or phases to be queried.

A search engine may be used to process digital signals representative of and/or otherwise associated with web documents. For example, a search engine may provide or otherwise employ on a "crawler" (also referred to as "crawler", "spider", "robot") that may "crawl" the Internet in some manner to locate such digital signal information (e.g., web documents). Upon locating a web document, the crawler may store digital signals relating to the document's URL, and possibly follow any hyperlinks associated with the web document to locate other web documents.

A search engine may, for example, include digital signal information extraction and/or indexing mechanisms adapted to extract and/or otherwise index certain digital signal information about the web documents that were located by the crawler. Such digital signal index information may, for example, be generated based on the contents of an HTML file associated with a web document. A digital signal indexing mechanism may store digital signal index information in a memory mechanism, e.g., as part of a database.

A search engine may provide a search tool that allows users to search the database. The search tool may include a user interface to allow users to input or otherwise specify search terms (e.g., keywords or other like criteria) and receive and view search results. Such inputs and results may be represented by digital signals. A search engine may present the search results in a particular order, for example, as may be indicated by a ranking scheme. For example, the search engine may present an ordered listing of search result summaries in a search results display. Each search result summary may, for example, include digital signal information about a website or web page such as a title, an abstract, a link, and possibly one or more other related objects such as an icon or image, audio or video information, computer instructions, or the like.

One or more data files represented by digital signals may be processed (e.g., rendered) to transform such digital signals into corresponding digital and/or analog signals that may be used to visually display (and possibly audibly reproduce) content information associated with the web page. It should be understood that the term "content information" as used herein may include digital signals and/or corresponding analog signals that are, at least in part, representative and/or otherwise communicative of data that may be transformed and/or otherwise processed in some manner to render and/or otherwise display and/or reproduce content for consumption (e.g., viewing, listening) and/or subsequent interaction by a user. As is known, digital signals may be converted to analog signals, and vice versa. As is known, such digital signals may be written to, stored in and read from a memory.

With this in mind, a displayed web page may include various types of content information, some of which may be of more or less interest to a viewer. By way of example but not limitation, in addition to providing intended "main" content information, a displayed web page may also include other "supportive" content information, e.g., web page or website navigation information such as selectable links, branding information such as iconic images, copyright and/or other like disclaimer information, and/or other like information that may be associated with a web page/site, an entity associated with the web page, and/or the main content. A web page, for example, often includes supportive content information in the form of advertisements and/or other like promotional content that may be considered of potential interest to a viewer. Banner advertisements and/or the like, for example, may be included in a displayed web page in a manner that allows for viewer selective interaction.

Of course, there may be significant differences in how such "main" and "supportive" content information may be specified within one or more data files associated with a web page and/or website. There may also be significant differences in how "main" and "supportive" content information are visually arranged in a displayed web page upon rendering.

With this in mind, techniques are presented herein in which "segmented portions" of a displayed web page are classified and indexed according to their classification. Such techniques may, for example, allow for classification based on types of content information. Certain types of segmented portions may be of more interest to a viewer, and hence more relevant to a search or other like retrieval or data mining function than other portions within a web page.

Figure 1:
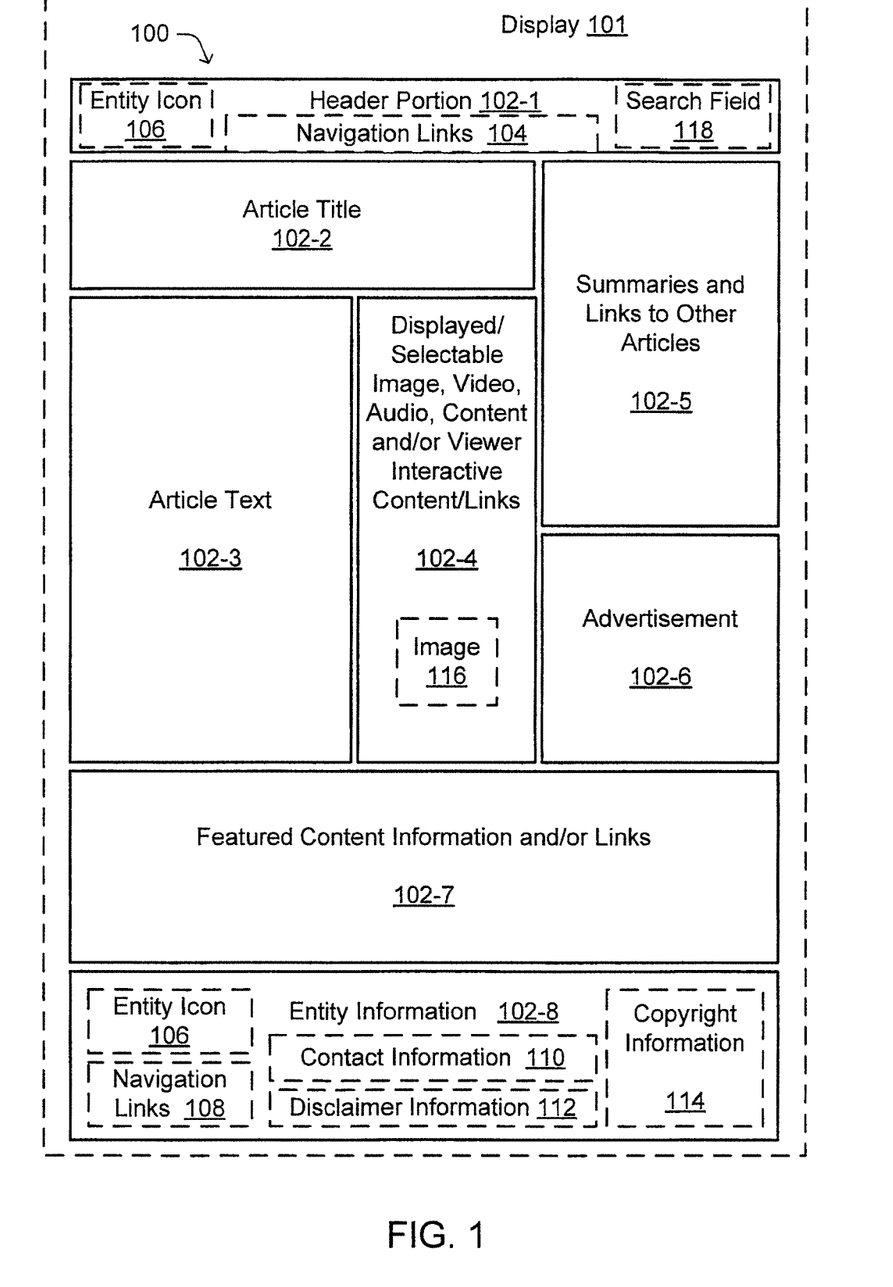
FIG. 1 is an illustrated representation of a displayed web page having an organization in which portions of the displayed web page may be identified as segmented portions, in accordance with certain example implementations.

Attention is now drawn to FIG. 1, which is an illustrated representation of a web page 100 as displayed using a display device 101. As shown, displayed web page 100 has a layout as might be of use to a news agency. Here, by way of example but not limitation, web page 100 may include various sections, etc., that may be identified as segmented portions 102. Here, for example, some initial segmented portions may include a header portion 102-1, which may include one or more web site navigation links 104, an entity icon 106, a search field 118 (e.g., associated with a user interface), and/or other like content (not shown). An article title portion 102-2 may be provided along with an article text portion 102-3. Another content portion 102-4 may be provided that includes displayed/selectable image, video, audio, and/or certain interactive content/links, which may or may not be associated with article text portion 102-3. In certain examples, an image 116 and/or other like content may be included which may be related to article text portion 102-3. In another content portion 102-5, summaries and links to other (possibly related) articles may be presented. A content portion 102-6 may be provided in which advertisement content information is presented. Another content portion 102-7 may include other featured content information and/or links. As shown in this example, another content portion 102-8 may be included in the web page to provide additional information to the viewer (e.g., user) with regard to the web page, website, entity, etc. Here, for example, entity information may include an entity icon 106, navigation link(s) 108, contact information 110, declaimer information 112, copyright information 114, and/or other like content information (not shown).

Figure 2A:
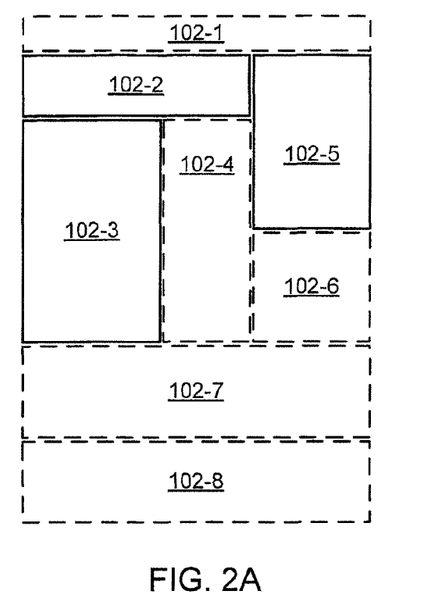
FIG. 2A is an illustrated representation of the displayed web page as in FIG. 1, wherein certain segmented portions have been classified as representing a particular segment type, in accordance with certain example implementations.
Figure 2B:
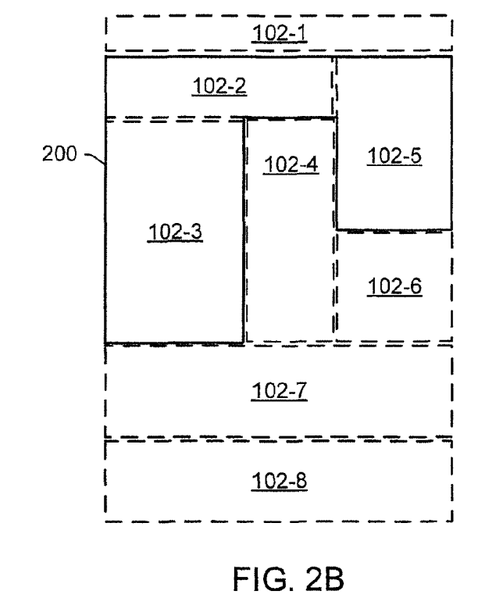
FIG. 2B is an illustrated representation of the displayed web page as in FIG. 2A, wherein two or more segmented portions classified with the same or similar segment types have been combined as represented by a single segmented portion, in accordance with certain example implementations.

FIGS. 2A and 2B also graphically show web page 100 with such example segmented portions 102-1 through 102-8. In FIG. 2A, certain segmented portions (here, 102-2, 102-3 and 102-5) have been classified as representing a particular segment type, which is in some manner different from the remaining segmented portions (here, 102-1, 102-4, 102-6, 102-7, and 102-8), in accordance with certain example implementations. More specifically in the example context of the news agency web page, sections relating to the article title (identified as segmented portion 102-2), article text (identified as segmented portion 102-3), and summaries and links to other articles (identified as segmented portion 102-5) may, for example, be classified as of a type representing "main" content information. The remaining segmented portions may, for example, be classified as of a type representing "supportive" content information.

As further illustrated in FIG. 2B, in certain example implementations two or more initially segmented portions having the same, similar and/or otherwise specified relationship, may be combined and/or otherwise associated together to form a single segmented portion that may be classified by common or resulting type(s). Here, for example, initially segmented portions 102-2, 102-3 and 102-5 are illustrated as being combined to form a segmented portion 200.

Figure 3:
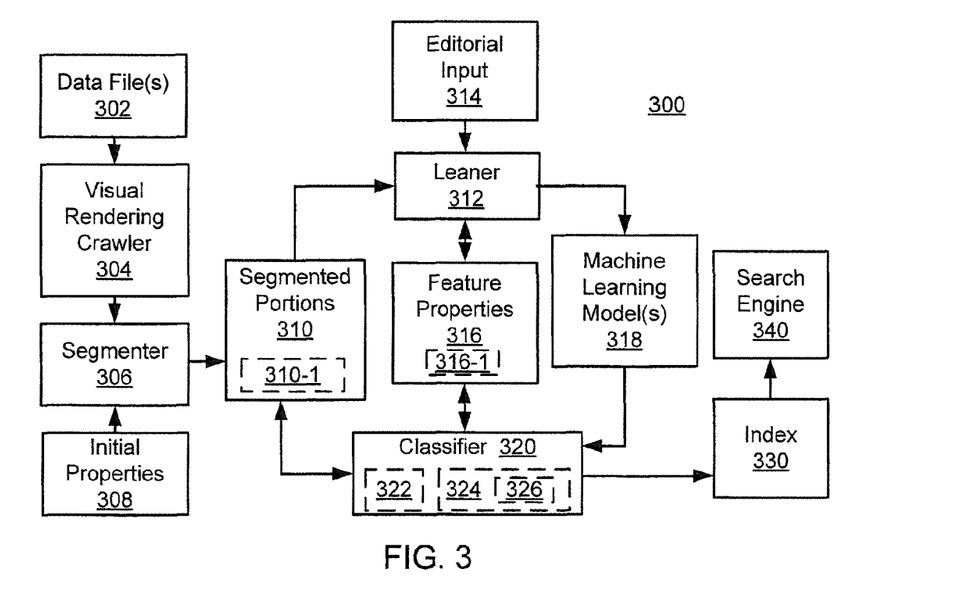
FIG. 3 is a functional portion diagram illustrating a data processing system that may be implemented to employ machine learning techniques and related methods and apparatuses for classifying and indexing segmented portions of one or more displayed web pages, such as in FIG. 1, in accordance with certain example implementations.

With the non-limiting examples of FIGS. 1, 2A and 2B in mind, attention is drawn next to FIG. 3, which is a functional portion diagram illustrating a data processing system 300 that may be implemented to employ machine learning techniques and related methods and apparatuses for segmenting, classifying and indexing web pages, in accordance with certain example implementations.

It should be understood that data processing system 300 is also a non-limiting example implementation. Data processing system 300 may, for example, be operatively enabled using one or more computing devices (e.g., special purpose computing device), one or more data storage devices, one or more data communication devices, one or more computer readable media, computer instructions, computer applications and/or tools, various circuitry, and/or input data, as described herein in particular example implementations.

As illustrated in this example, data processing system 300 may include one or more data files 302 which may provide one or more digital signals related to one or more displayable web pages. Such data files may include digital signals stored in a data storage device (e.g., memory). Date files 302 may, for example, be received or otherwise accessed as digital signals available from one or more networked servers.

A visual rendering crawler 304 and/or other like crawler function may be employed to provide or otherwise identify all or part of data files 302 to a segmenter 306. Segmenter 306 may be enabled to automatically identify one or more initial segmented portions 310. For example, in certain implementations, segmenter 306 may be enabled to identify one or more initial segmented portions 310 based, at least in part, on one or more initial properties 308. By way of example but not limitation, some initial properties may include one or more layout properties that may be derived from coordinates of the DOM nodes included in candidate segments/portions. Some initial properties may include, for example, font size, font weight, and/or other like visual property of textual content. Some initial properties may include, for example, a link density, and/or other like link property.

As shown, in certain example situations a portion of segmented portions 310 may be used as a sample set of segmented portions 310-1 and provided to or otherwise accessed by a learner 312. Learner 312 may, for example, include one or more machine learning applications and/or tools that may be enabled to establish one or more machine learned models 318. Here, for example, learner 312 may be enabled to establish one or more machine learned models 318 based, at least in part, on a sample set of segmented portions 310-1, editorial input 314, and/or one or more feature properties 316. In other example implementations, a machine learned model 318 may be established without editorial input, e.g., in the unsupervised mode. In certain example implementations, learner 312 may be enabled to recognize, modify, and/or otherwise establish one or more feature properties 316. For example, in certain implementations, learner 312 may be enabled to establish one or more vector space (digital signal) representations 316-1, which may be of use to a classifier 320 and/or other data processing function. Various tools are available, such as, for example, TreeNet by Salford Systems of San Diego, Calif. is a commercially available tool that implements Gradient Boosted Decision Trees (GBDT), and/or Matlab by Mathworks of Natick, Mass. provides several algorithms for machine learning including clustering.

As shown, in this example, classifier 320 may be enabled to classify segmented portions 310 based, at least in part, on one or more machine learned models 318 and/or one or more feature properties 316. For example, classifier 320 may be enabled to classify segmented portions 310 by segment type(s) 322. In certain example implementations, classifier 320 may establish segmented portion key-value information 324 for one or more segmented portions 310. More specifically, in certain example implementations, segmented portion key-value information 324 may include a segment portion score 326 (e.g., as the value portion of segmented portion key-value information 324). Here, for example, in certain implementations, a "key" within segmented portion key-value information 324 may include a segment number or ID, a "value" may include a content type, such as, e.g., an advertisement, a menu bar, etc., and a segment portion score 326 may include a resulting parameter based on one or more machine learned model(s), e.g., corresponding to the particular content type that predicts a classification confidence and/or other like measure. In certain example implementations, a classifier confidence may be compared to a threshold and a resulting binary membership decision recorded as a resulting parameter. In certain example implementations, a quantized value (e.g., with just a few levels), and/or a raw value (e.g., a floating point representation of a continuous scale) may be provided as a resulting parameter. In certain example implementations, "content quality" may itself be considered a type. Thus, for example, a type may be any property that may be identified by a human (e.g., in the supervised learning mode) or a machine (e.g., in an unsupervised learning mode).

In certain example implementations, classifier 320 may be enabled to recognize, modify, and/or otherwise establish one or more feature properties 316. Feature properties 316 may, for example, relate to various features associated with one or more segmented portions and/or portion types. Some example features that may be considered are described in greater detail in subsequent sections.

In certain example implementations, classifier 320 may be enabled to recognize, modify, and/or otherwise establish one or more segmented portions 310. For example, as illustrated in FIG. 2B, classifier 320 may be enabled to selectively combine two or more segmented portions 316.

As shown in this illustrated example, classifier 320 may be enabled to provide and/or otherwise make available one or more digital signals representing one or more classification results directly and/or indirectly to an index 330. By way of example but not limitation, index 330 may include digital signals representing a search index that may be accessed and processed in some manner by a search engine 340, and/or otherwise accessed and used in support of a search process in response to a search query.

Figure 4:
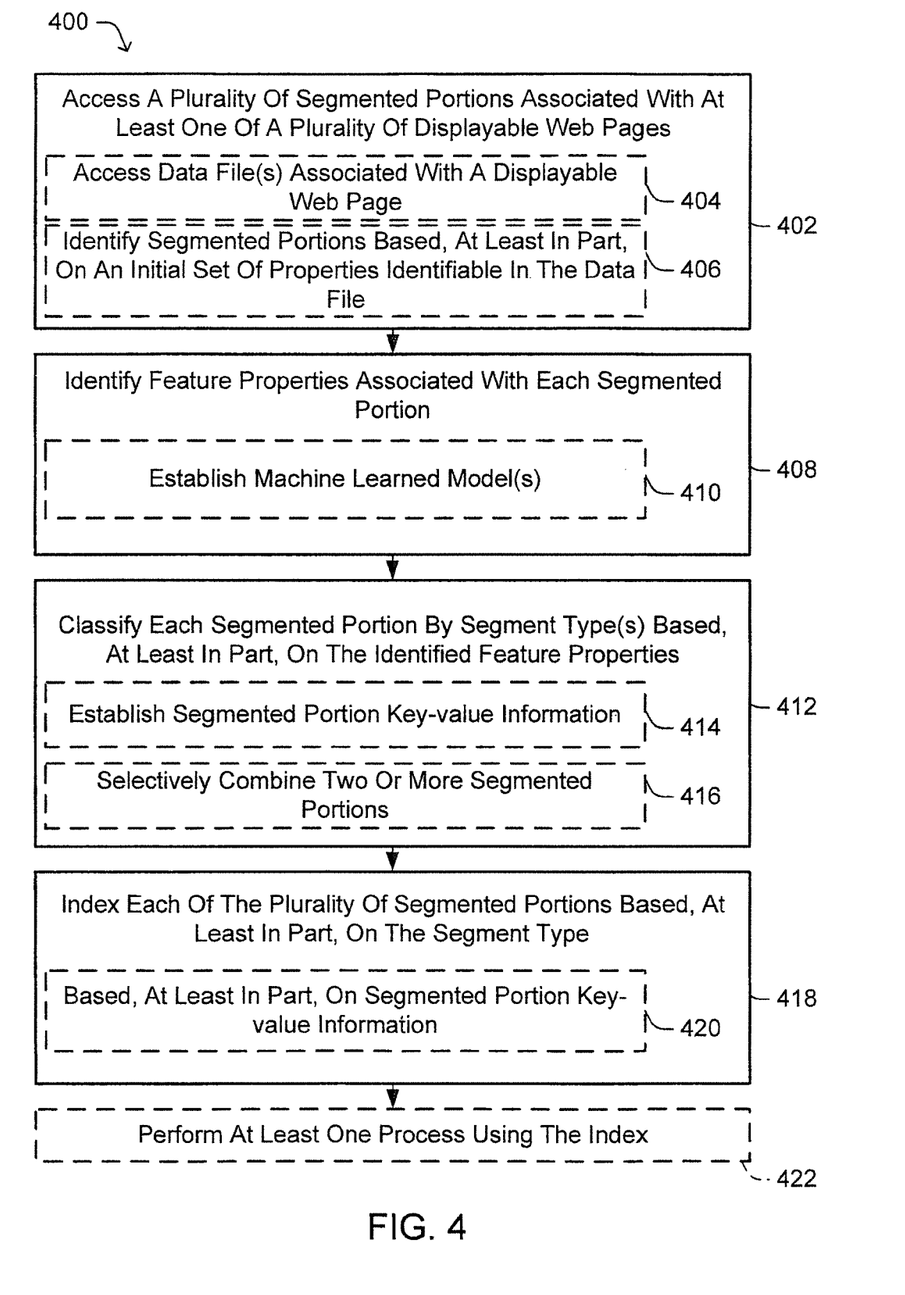
FIG. 4 is a flow diagram illustrating a process for classifying and indexing segmented portions of one or more displayed web pages that may be implemented using one or more apparatuses in a data processing system, as in FIG. 3, in accordance with certain example implementations.

Attention is drawn next to FIG. 4, which is a flow diagram illustrating an example process 400 that may be implemented in whole or part, e.g., in one or more special purpose computing devices, for classifying and/or indexing segmented portions of one or more displayable web pages.

At block 402, one or more digital signals representing a plurality of segmented portions associated with at least one of a plurality of displayable web pages may be accessed from a data storage mechanism (e.g., memory). In certain implementations, at block 404, one or more digital signals representing one or more data file(s) associated with a displayable web page may be accessed from memory. In certain implementations, at block 406, one or more digital signals representing one or more segmented portions may be identified based, at least in part, on an initial set of properties which may be identifiable in such data file(s). Blocks 404 and/or 406 may be optional in certain implementations.

In certain example implementations, it may be beneficial at block 402 to employ one or more page segmentation processes to exhaustively separate all parts of a web page. Thus, for example, a template detection or like information extraction processes that may be limited to marking-up only part of the page may be less useful and/or might benefit by adding additional functionality. In certain example implementations, it may be beneficial at block 402 to have the resulting segmented portions to be semantically coherent or substantially semantically coherent. Such coherency may be useful, for example, at blocks 408 and/or 412 to provide for successful content quality prediction and/or the like.

In certain implementations, for example, one may employ a layout and Document Object Model (DOM) based process which may use a rule based process that starts with a single segmented portion including all DOM nodes, and divides segmented portions (portions) recursively into smaller segments until a desired size is reached. The desired size may be determined, for example, by rules based, at least in part, on HTML tags in a segmented portion and/or a size of a segment relative to the web page and the other segmented portions. While dividing, it may be useful to provide semantic coherence, for example, by having segmented portion that do not span horizontal and vertical visual separators such as lines or white space, and/or by maintaining a coherence metric for each segmented portion, e.g., based on visual clues such as background color, font color and font weight.

By way of example but not limitation, example segmentation techniques are disclosed in related, co-pending U.S. patent application Ser. No. 11/971,160, filed Jan. 8, 2008, titled "Automatic Visual Segmentation of WebPages".

At block 408, a segmented portion may be identified as being associated with one or more feature properties. In certain implementations, at block 410, one or more digital signals representing machine learned model(s) may be established based, at least in part, on editorial input associated with at least a sample set of segmented portions.

Such identified feature property association(s) and/or machine learned model(s) may be employed, for example, at block 412, to classify a segmented portion as being of at least one segment type. In certain implementations, at block 414, one or more digital signals representing segmented portion key-value information may be established. In certain implementations, at portion 416, two or more segmented portions may be selectively combined.

In certain implementations, for example, at block 412, one or more digital signals representing segmented portion key-value information and/or one or more digital signals representing segment portion scores may be related to segment content quality scores. Here, for example, in certain implementations such information and/or scores may be directly and/or indirectly provided to and/or otherwise utilize in some manner in the ranking function or other like function associated with a search engine to possibly enhance the relevance of the search results. To promote such content quality and/or other like machine learned models and/or to refine feature properties associated with the classification process, a learner may be trained, for example, at block 410 in a supervised learning setting that may allow for leveraging of a rich feature space. In certain implementations, for example, a feature space for machine learned segmented portion classification may include visual and/or content based feature properties. By way of example but not limitation, feature properties may include various layout features such as, e.g., measurements and/or relative measurements for segmented portions upon rendering a web page, absolute size and/or position of segmented portions, a size of a segmented portion relative to the web page and/or a relative position of a segmented portion with respect to the web page as well as a "visible fold", and/or other like layout characteristics if interest. Such features may, for example, be useful in classifying segmented portions as they are presented in the displayed web page. By way of example but not limitation, feature properties may include various content features which may be based on a variety of measurements. For example, some content features may be identified from a rendered web page such as, e.g., a font size, weight, style, and/or color, as well as an image size if a segmented portion contains an image. Some content example content features may be identified from the underlying HTML and/or content; for example, capitalization and punctuation densities in text as well as link and image densities. By way of example but not limitation, feature properties may include various language features. Here, for example, simply term frequencies for a small set of editorially selected words may be considered and provided in template segments, such as, e.g., navigation, copyright, disclaimer as well as some non-template supportive content information segments such as advertisement and related links. In certain example implementations, gradient boosted trees (GBT) and/or other like techniques may be used, e.g., with logistic loss to learn a model applicable to differentiating between main content information and one or more other types of supportive content information.

At block 418, segmented portions may be indexed in some manner. For example, segmented portions may be indexed based, at least in part, on segment type. For example, segmented portions may be indexed based, at least in part, on segmented portion key-value information.

At block 422, at least one data processing process may be performed based, at least in part, on the index. By way of example but not limitation, a search query process may be performed which considers the index.

By way of example but not limitation, at block 422, the index may include content quality information and/or scores for the segmented portion of a web page as classified using statistical and/or rule based classification techniques, etc. One possible benefit is that such content quality information may be considered in some manner in providing/performing other functions/services, such as, for example, matching a query to a document, classification of a document by global properties (e.g., "spam" or quality), summarizing a document, duplicate document detection, anchor text extraction and weighting, web graph processing, crawling decisions, document topic characterization, advertisement matching, display optimization for certain devises, featured content and document velocity detection, and/or the like. Here, for example, a "velocity" may identify or otherwise be related to a rate of change (e.g., mean rate of change) of content of a document over a period of time.

Figure 5:
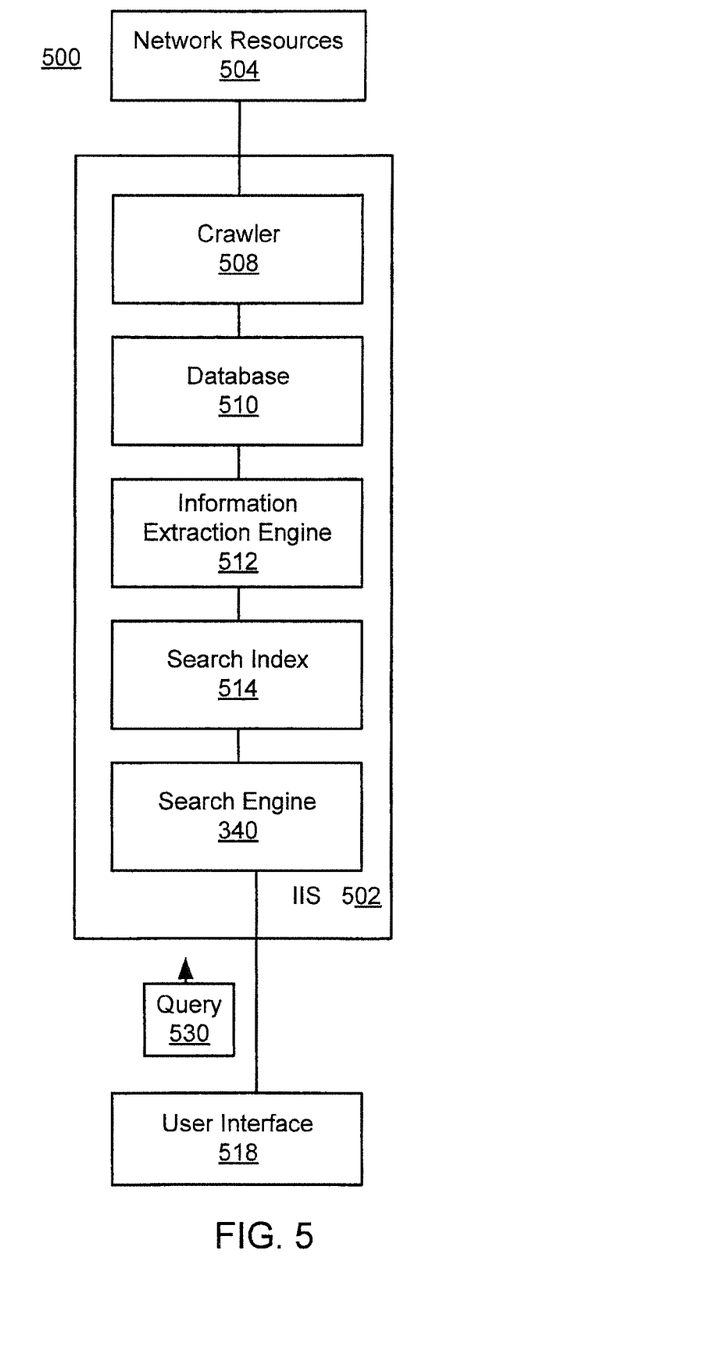
FIG. 5 is a schematic portion diagram illustrating an exemplary computing system including an information integration system having a search engine that may be operatively enabled to consider and/or otherwise utilize resulting information from a process, for example, as in FIG. 4, which classifies segmented portions of one or more displayed web pages, in accordance with certain example implementations.

Attention is now drawn to FIG. 5, which is a portion diagram illustrating a computing environment 500 having an Information Integration System (IIS) 502. Here, for example, IIS 502 may include a search engine 340 (e.g., as in FIG. 3) that may include a ranking function or the like.

IIS 502 may include a crawler 508 that may be operatively coupled to network resources 504, which may include, for example, the Internet and the World Wide Web (WWW), one or more servers, etc. IIS 502 may include a database 510, an information extraction engine 512, search engine 340 backed, for example, by a search index 514 and possibly associated with a user interface 518 through which a query 530 may initiated.

Crawler 508 may be adapted to locate data files associated with web pages. Crawler 508 may also follow one or more hyperlinks associated with the page to locate other web pages. Upon locating a web page, crawler 508 may, for example, store the web page's URL and/or other information in database 510. Crawler 508 may, for example, store an entire web page (e.g., data files comprising HTML, XML, or other like code, content, etc.) and URL in database 510.

Search engine 340 may, for example, be used to help index and/or otherwise search for content that may appear in web pages. Search engine 340 may be used in conjunction with a user interface 518, for example, to retrieve and present search results associated with search index 514. The information associated with search index 514 may, for example, be generated by information extraction engine 512 based on extracted content of an HTML file associated with a respective web page. Extraction engine 512 may in certain example implementations, include all or part of the functionality of data processing system 300 (FIG. 3). In certain example implementations, search index 514 may include all or part of index 330 (FIG. 3). In certain example implementations, at least a portion of search index 330 and/or 514 may be included in database 510 or other like data storage mechanism.

Figure 6:
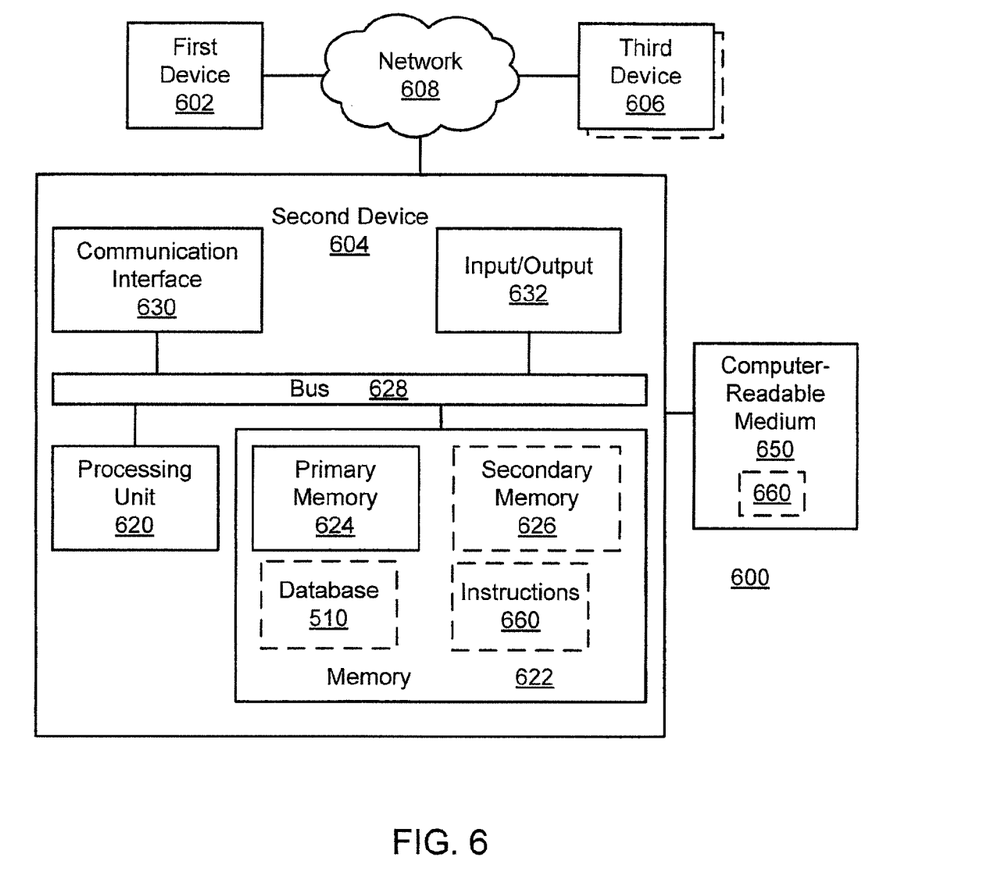
FIG. 6 is a schematic portion diagram illustrating an exemplary embodiment of a computing environment having one or more computing devices that may be operatively enabled to form one or more special purpose computing devices in a system supportive of at least a portion of a process, for example, as in FIG. 4, which classifies segmented portions of one or more displayed web pages, in accordance with certain example implementations.

Reference is now made to FIG. 6, which is a portion diagram illustrating an exemplary embodiment of a computing environment system 600 all or portions of which may, for example, be used to implement at least a portion of the techniques provided herein, and in particular data processing techniques for classifying and indexing segmented portions of web pages as represented using digital signals.

Computing environment system 600 may include, for example, a first device 602, a second device 604 and a third device 606, which may be operatively coupled together through a network 608.

First device 602, second device 604 and third device 606, as shown in FIG. 6, are each representative of any electronic device, appliance or machine that may be configurable to exchange data over network 608. By way of example but not limitation, any of first device 602, second device 604, or third device 606 may include: one or more computing devices or platforms, such as, e.g., a desktop computer, a laptop computer, a workstation, a server device, data storage units, or the like. Such devices may be transformed in to special purpose computing devices and/or other like apparatuses based, at least in part, on computer implementable instructions 660.

Network 608, as shown in FIG. 6, is representative of one or more communication links, processes, and/or resources configurable to support the exchange of data between at least two of first device 602, second device 604 and third device 606. By way of example but not limitation, network 608 may include wireless and/or wired communication links, telephone or telecommunications systems, data buses or channels, optical fibers, terrestrial or satellite resources, local area networks, wide area networks, intranets, the Internet, routers or switches, and the like, or any combination thereof.

As illustrated, for example, by the dashed lined box illustrated as being partially obscured of third device 606, there may be additional like devices operatively coupled to network 608. Here, for example, third device 606 may represent a plurality of similar or different web page servers, advertisement servers, and/or the like.

It is recognized that all or part of the various devices and networks shown in system 600, and the processes and methods as further described herein, may be implemented using or otherwise include hardware, firmware, or any combination thereof along with software.

Thus, by way of example but not limitation, second device 604 may include at least one processing unit 620 that is operatively coupled to a memory 622 through a bus 628.

Processing unit 620 is representative of one or more circuits configurable to perform at least a portion of a data computing procedure or process. By way of example but not limitation, processing unit 620 may include one or more processors, controllers, microprocessors, microcontrollers, application specific integrated circuits, digital signal processors, programmable logic devices, field programmable gate arrays, and the like, or any combination thereof.

Memory 622 is representative of any data storage mechanism. Memory 622 may include, for example, a primary memory 624 and/or a secondary memory 626. Primary memory 624 may include, for example, a random access memory, read only memory, etc. While illustrated in this example as being separate from processing unit 620, it should be understood that all or part of primary memory 624 may be provided within or otherwise co-located/coupled with processing unit 620.

Secondary memory 626 may include, for example, the same or similar type of memory as primary memory and/or one or more data storage devices or systems, such as, for example, a disk drive, an optical disc drive, a tape drive, a solid state memory drive, etc. In certain implementations, secondary memory 626 may be operatively receptive of, or otherwise configurable to couple to, a computer-readable medium 650. Computer-readable medium 650 may include, for example, any medium that can carry and/or make accessible data, code and/or instructions 660 for one or more of the devices in system 600.

Additionally, as illustrated in FIG. 6, memory 622 may include a data associated with a database 510 (FIG. 5). Such data may, for example, be stored in primary memory 624 and/or secondary memory 626.

Second device 604 may include, for example, a communication interface 630 that provides for or otherwise supports the operative coupling of second device 604 to at least network 608. By way of example but not limitation, communication interface 630 may include a network interface device or card, a modem, a router, a switch, a transceiver, and the like.

Second device 604 may include, for example, an input/output 632. Input/output 632 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 632 may include an operatively adapted display (e.g., such as, display device 101 of FIG. 1), speaker, keyboard, mouse, trackball, touch screen, data port, etc.

Thus, as illustrated in the various example implementations and techniques presented herein, in accordance with certain aspects a method may be provided for use as part of a special purpose computing device and/or other like machine that accesses digital signals from memory and processes such digital signals to establish transformed digital signals which may then be stored in memory as part of one or more data files and/or a database specifying and/or otherwise associated with an index. Such an example method may include, for each of a plurality of segmented portions associated with at least one of a plurality of displayable web pages, using one or more machine learned models to: (1) identify one or more feature properties associated with the segmented portion within at least one corresponding data file associated with the displayable web page, and/or otherwise inferable from the at least one corresponding data file, and (2) classify each of the plurality of segmented portions as being at least one of a plurality of segment types based, at least in part, on the one or more identified feature properties. Such example method may also include indexing each of the plurality of segmented portions based, at least in part, on the segment type.

In certain implementations, such an example method may include, for each of the plurality of segmented portions, establishing segmented portion key-value information associated with each of the one or more machine learned models. Such segmented portion key-value information may, for example, include a segment portion score. In certain implementations, such an example method may include indexing at least one of the plurality of segmented portions based, at least in part, on at least a portion of the segmented portion key-value information.

In certain implementations, such an example method may include selectively combining two or more of the plurality of segmented portions to form a single segmented portion based, at least in part, on any feature(s) that may be used for classifying/labeling. For example, certain example methods may include selectively combining two or more of the plurality of segmented portions to form a single segmented portion based, at least in part, on the plurality of segment types of the two or more of the plurality of segmented portions.

In certain implementations, such an example method may include training at least one of the one or more machine learned models based, at least in part, on editorial input associated with a sample set of segmented portions. In certain implementations, such an example method may include one or more machine learned models that are established without editorial input (e.g., trained in an unsupervised mode). In certain implementations, such an example method may include using at least one of such machine learned models operating in an unsupervised mode. For example, a machine learned model operating in an unsupervised mode may be used to identify or otherwise establish a vector space representation (e.g., representation by multiple properties or signals) as one of the feature properties.

In certain other implementations, for example, an apparatus may be provided which includes a data storage mechanism having stored therein at least one data file associated with at least one displayable web page, and at least on processing unit coupled to the data storage mechanism. Here, for example, the processing unit may be operatively enabled to, for each of a plurality of segmented portions associated with the at least one displayable web page, use one or more machine learned models to: (1) identify one or more feature properties associated with the segmented portion within at least one corresponding data file associated with the displayable web page, and/or otherwise inferable from the at least one data file using one or more machine learned models, and (2) classify each of the plurality of segmented portions as being at least one of a plurality of segment types based, at least in part, on the one or more identified feature properties. Such processing unit may also be operatively enabled to index each of the plurality of segmented portions based, at least in part, on the segment type.

In certain other implementations, for example, an article of manufacture may be provided which includes a computer readable medium having computer implementable instructions stored thereon which if implemented by one or more processing units in a computing device operatively transform the computing device into a special purpose device. Such special purpose device may, for example, be enabled to, for each of a plurality of segmented portions associated with at least one of a plurality of displayable web pages, use one or more machine learned models to: (1) identify one or more feature properties associated with the segmented portion within at least one corresponding data file associated with the displayable web page, and/or otherwise inferable from the at least one corresponding data file, and (2) classify each of the plurality of segmented portions as being at least one of a plurality of segment types based, at least in part, on the one or more identified feature properties. Such special purpose device may also, for example, be enabled to index each of the plurality of segmented portions based, at least in part, on the segment type.

In certain example implementations, a process for classifying segmented portions may benefit from a rich feature space. By way of example but not limitation, some example features are presented below which may be taken into consideration, in whole or part, in certain implementations. Such example features may be identified and/or otherwise operatively enabled by one or more feature properties.

As presented below, some example features may be arranged under feature type headings. Where the example features are based on distribution of various properties, for example, statistics may be considered that include but are not limited to one or more of the following: a number of instances; a ratio, a rate and/or frequency (e.g., such as a percentage); a minimum; a maximum; a median; a mode; a mean; a percentile of mean; a ratio of values at various quantiles to other statistics, such as, a minimum, a mean, a maximum; an entropy; mutual information; and/or the like or any combination thereof.

In certain example implementations, one or more features of a segmented portion may be considered as absolute values for the segmented portion under consideration or relative values based on comparison to other segmented portions (e.g., of the same web page, and/or any other collection of segmented portions).

With this in mind, some example feature properties may be related to and/or used to consider certain layout features of a segmented portion, including various measures relating to the display of the segmented portion and/or the related web page (e.g., as rendered using a default or other specified browser function). For example, certain feature properties may be related to and/or used to consider measurements of size, width, height, area, ratio of segment width to height, and/or the like, e.g., relative to a displayed web page.

Certain feature properties may be related to and/or used to consider a position of a segmented portion, e.g., a relative position on the displayed web page. For example, certain feature properties may be related to and/or used to consider spherical coordinates (or other like coordinates) associated with the center or other point of reference of a segmented portion with regard to a top left corner or other like point of reference of the displayed web page. In some examples, feature properties may be related to and/or used to consider a distance or other like measurement, e.g., in percent pixels as well as number and percent of segmented portions from top, bottom, left, right borders of a displayed web page. For example, such measurements may include one or more of: a number of segmented portions with lower edge below a lower edge of a current segmented portion and/or such number divided by total number of segmented portions; number of segmented portions with upper edge above upper edge of current segment and/or such number divided by total number of segmented portions; number of segmented portions with left edge to the left of a current segmented portion and/or such number divided by total number of segmented portions; and/or number of segmented portions with right edge to the right of current segmented portion and/or such number divided by total number of segmented portions.

In certain example implementations, certain size and/or position features (e.g., as above) may be expressed relative to "folds" in the web page. For example, a "fold" may separate a visible portion of a displayed web page from a portion that does not fit into the display or window at the set resolution of the display device. For example, it may be useful to consider "visibility" as a percentage with respect to various folds. Alignment with respect to other segmented portions including immediate neighbors and others, may also and/or alternatively be considered as part of a rich feature space.

Certain feature properties may be related to and/or used to consider visual features of one or more segmented portions. Here, for example, feature properties may be related to and/or used to measure or otherwise consider distribution statistics relating to one or more colors of one or more objects (e.g., background objects, foreground objects). For example, some feature properties may consider distribution statistics relating to one or more textures of one or more of such objects. For example, some feature properties may consider the presence of a background image, tiling, etc. For example, some feature properties may consider color distributions as may be represented in a vector space with some similarity metric (e.g., RGB, HSV, etc.) or any other similar form. For example, some feature properties may consider textures as may be represented by parameters of models such as Markov Random Fields, or a texture dictionary, or any other like form.

Certain feature properties may be related to and/or used to consider visual properties of the textual content information of a segmented portion. For example, some feature properties may consider statistics derived from a format of the content information, e.g., font size, font color, font weight (bold, italic, underlined, etc.), font face type, and/or the like. For example, some feature properties may consider distributions for such formats, e.g., counted at various granularities. Here, for example, distributions may be counted by: DOM nodes, e.g., a total font size divided by the number of DOM nodes; tokens, e.g., a total font size (possibly weighted by token counts in a segmented portion) divided by a number tokens; characters, e.g., a total font size (possibly weighted by character counts in each segmented portion) divided by the number of characters; and/or the like.

Certain feature properties may be related to and/or used to consider language model based features of the content information of a segmented portion. For example, some feature properties may be established and/or otherwise provided using one or more language models, e.g., a Statistical Natural Language Processing and Information Retrieval, which may consider term selection using chi-square or other known feature selection techniques. Here, for example, Naïve-Bayes and/or other like statistical models may be developed and employed which may be based on word unigram and bigram probabilities. In certain implementations, for example, a logistic regression process may be employed to produce a language fit score and/or the like for segmented portion.

By way of example but not limitation, some languages of interest for identification may include: promotional language, e.g., advertisements, sponsored results, sponsored links, etc.; legal language, e.g., copyrights, trademarks, service marks, etc.; navigation/footer language, e.g., help, contact, webmaster, sitemap, site map, site info, FAQ, about, feedback, e-mail, table of contents, careers, investors, investor relations, press, associate, affiliate, privacy, policy, terms of use, conditions of use, company, profile, accessibility statement, disclaimer, home, browse, search, help, cart, account, buy, click, here, shop, permalink, comments, e-mail this, read, links, link exchange, related search, related, search, topic, relevant, posts, categories, filter, featured content, current, top, popular, calendar, month, year, day of week, hours, certain numbers (1 . . . 31, etc.), and/or other like terms, language, topics, etc.

Certain feature properties may be related to and/or used to consider heuristic based language features of the textual content information in a segmented portion. For example, some feature properties may be used to consider the use of capitalization, punctuations, token separators, and/or the like, that may affect the content information. Here, for example, certain feature properties may be used to measure various features of tokens, such as: a distribution statistics of tokens (e.g., words separated by white space); capitalization distribution statistics including but not limited to capital letters, capitalized words, words in all-caps, punctuation distribution statistics, etc.; sentence size distribution statistics (e.g., distribution of one-word sentences, two-word sentences, etc.); META DOM node distribution statistics, wherein for example, a META DOM node may include DOM elements that have headings in bold or italicized string ending with colon; a ratio of DOM elements that are META to a total number of DOM nodes in segmented portion; and/or the like.

Certain feature properties may be related to and/or used to consider topical coherence features of textual content information of a segmented portion. For example, some feature properties may be used to classify a segmented portion using topical categorizer banks established using various known directory classifier processes. Here, for example, a vector representation of a segmented portion may be used as a topical signature for a similarity measurement. Measure language model based similarity. For example, vector space or probabilistic language models of segmented portions may be established and compared with such from other segmented portions for instance by mutual information. In some example implementations, a measure of noun set intersections between two segmented portions may serve as a similarity measure. Here, for example, known part-of-speech tagging processes and/or the like may be used to identify applicable noun sets. Furthermore, some feature properties may, for example, be used to consider topical coherence within a segmented portion by applying such techniques as above over sliding sections within one or more segmented portion(s). In certain other example implementations, some feature properties may be used to consider topical coherence of a segmented portion with respect other individual segmented portions, such as, neighboring or otherwise nearby segmented portions (e.g., on the visual layout, in a DOM, and/or all other segmented portions), or with respect to whole displayed web page where all other segmented portions are considered as one segmented portion.

Certain feature properties may be related to and/or used to consider segmented portion features based on entity/entities, etc. For example, some entities may use certain expressions or other content information that may be identified in some way in accordance with certain example feature properties. Thus, for example, such feature properties may be used to identify or establish with some certainty some entity/entities as one might with other content tokens or general dimensions with segmented portions represented in vector space and/or probabilistic models. For example, certain entities may include but are not limited to: a date; a time; a URL; an electronic mail address; other address; a mailing code (Zip code); a phone number; and/or the like. Some example feature properties may be related to and/or used to consider specific words of interest. For example, a segmented portion that includes contact information may typically include words and phrases such as "FAX", "Contact us" or "Driving directions". Thus, for example, feature properties may include one or more words, terms, phrases, character strings, lists, etc.

Feature properties may be related to and/or used to consider certain link properties of a segmented portion. For example, some feature properties may relate to general statistics of distribution of various types HTML links in segmented portion(s). Here, for example, distribution statistics of HTML links may be considered, such as, links internal to a host or domain, links external to a host or domain, or all links. In other examples, distribution statistics of user interface features (e.g., buttons, etc.) may be considered.

Further still, certain example feature properties may be related to and/or used to consider features that may be determined from textual content of one or more links (e.g., HTML links, etc.). For example, one or more feature properties may be related to and/or used to consider if a link URL path includes nonstandard text (e.g., characters other than a given or standard alphanumeric character set). For example, one or more feature properties may be related to and/or used to consider if a link URL path contain arguments, parameters, encoded string, keywords or program extensions. For example, feature properties may be related to and/or used to consider if a link is anchored by an image that includes text matching a given link URL. Here, for example, such feature properties may be used to consider: a token length of a link URL; a character length of a link URL; a token length of anchor text; a character length of anchor text; a corpus frequency and/or distribution statistics of anchor text terms; a document frequency and/or distribution statistics of anchor text terms; a segment frequency and/or distribution statistics of anchor text terms, and/or the like.

If links external to a host or domain are identified, then certain feature properties may be related to and/or used to consider if: the link URL host is different than the page URL host; the link URL is in a list of known ad servers; the link URL contains advertisement or other like related terms; and/or the like. If links internal to a host or domain are identified, then certain feature properties may be related to and/or used to consider if: the link URL server is different than a page URL server; there is an exact match of hosts; there is an anchor text match to link URL path (e.g., exact match, partial match anchor ratio, partial match URL ratio, etc.); and/or the like.

Certain feature properties may be related to and/or used to consider still other features based on certain specific and/or general properties. For example, some feature properties may be used to consider image content. Here, for example, one or more feature properties may include one or more of: image distribution statistics in the displayed web page; pixel size distribution statistics of all images, advertisement/promotional images, etc.; image alt-tag distribution statistics, e.g., ratio of images with alt-tag to the total number of images in the segmented portion; HTML tag features, e.g., HTML tag path tag type entropy, HTML tag type distribution statistics; tables, e.g., data tables, ratio of numbers and symbols to letters, etc.; web graph based features, e.g., shingles of all DOM sub-trees on root, parent, child and sibling pages on the web-graph (to identify similar segmented portions such as templates in similar pages), host information on ad images, etc.; and/or the like. A shingle, for example, may include a set of contiguous terms in a document that may be used for obtaining compressed but highly unique "signatures" or "fingerprints" of documents. Further, for example, one or more feature properties may be related to and/or used to consider one or more of: taxonomy breadcrumb features and/or pseudo-title features (e.g., a continuous set of words at the start of a section that share the same formatting (bold, size, color characteristics) within but different with respect to the rest of the section). In other example implementations, one or more feature properties may be related to and/or used to consider one or more: dynamic content features; JavaScript features; input box features; features based on various types of objects (e.g., presence and number of objects, flash, animation or mouseover, image maps, text embedded in graphics, image map links, etc.).

In other example implementations, one or more feature properties may be related to and/or used to consider one or more "Spam" properties, such as, a Spam score of section as a document, a number of advertisements, a topic coherence of advertisements with page content, and/or an amount of links that are of the same color as the background. In other example implementations, one or more feature properties may be related to and/or used to consider one or more query dependent properties for top N historical queries retrieving the page, such as, a position of match and/or a quality of match (e.g., proximity, etc.).

In other example implementations, one or more feature properties may be related to and/or used to consider one or more user interactions. For example, certain user interactions may be associated with web traffic data, eye-tracking studies, etc. For example, a probability of scan and/or probability of click may be considered.

In other example implementations, one or more feature properties may be related to and/or used to consider certain types of technology and/or tools that may have been used to generate a web page or web site.

Some portions of the detailed description which follow are presented in terms of processes and/or symbolic representations of operations on data bits or binary digital signals stored within memory, such as memory within a computing system and/or other like computing device. These process descriptions and/or representations are the techniques used by those of ordinary skill in the data processing arts to convey the substance of their work to others skilled in the art. A process is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "associating", "identifying", "determining", "allocating", "establishing", "accessing", and/or the like refer to the actions and/or processes of a computing platform, such as a computer or a similar electronic computing device (including a special purpose computing device), that manipulates and/or transforms data represented as physical electronic and/or magnetic quantities within the computing platform's memories, registers, and/or other information (data) storage device(s), transmission device(s), and/or display device(s).

According to an implementation, one or more portions of an apparatus, such as second device 604, for example, may store binary digital electronic signals representative of information expressed as a particular state of the device, here, second device 604. For example, an electronic binary digital signal representative of information may be "stored" in a portion of memory 622 by affecting or changing the state of particular memory locations, for example, to represent information as binary digital electronic signals in the form of ones or zeros. As such, in a particular implementation of an apparatus, such a change of state of a portion of a memory within a device, such the state of particular memory locations, for example, to store a binary digital electronic signal representative of information constitutes a transformation of a physical thing, here, for example, memory device 622, to a different state or thing.

While certain exemplary techniques have been described and shown herein using various methods and systems, it should be understood by those skilled in the art that various other modifications may be made, and equivalents may be substituted, without departing from claimed subject matter.

Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method comprising:
    with one or more special purpose computing devices coupled to a memory:
    accessing a plurality of segmented portions of at least one of a plurality of displayable web pages represented by one or more digital signals of one or more files stored in a memory, wherein a particular displayable web page of the plurality of displayable web pages comprises at least two of the plurality of segmented portions;
    using one or more machine learned models for:
        identifying one or more feature properties of the plurality of segmented portions within the one or more files, or otherwise inferable from the one or more files,
        classifying the at least two of the plurality of segmented portions as being at least one of a plurality of segment types based, at least in part, on the one or more identified feature properties, the one or more identified feature properties comprising at least language feature properties of a language model of content to be displayed in one or more of the at least two of the plurality of segmented portions, and
        determining content quality scores for at least two of the plurality of segmented portions of at least the particular displayable web page; and
    storing one or more digital signals in the memory as part of an index for the plurality of segmented portions, the index being based, at least in part, on the segment type, the index indicating the content quality scores.

2. The method as recited in claim 1, wherein the classifying of the at least two of the plurality of segmented portions further comprises:
    establishing segmented portion key-value content for at least one of the one or more machine learned models.

3. The method as recited in claim 2, wherein the segmented portion key-value content comprises a segment portion score.

4. The method as recited in claim 2, further comprising:
    with the one or more special purpose computing devices, indexing the at least one of the plurality of segmented portions based, at least in part, on at least a portion of the segmented portion key-value content.

5. The method as recited in claim 1, further comprising:
    with the one or more special purpose computing devices, combining the at least two of the plurality of segmented portions into a single segmented portion based, at least in part, on at least one feature for the two or more of the plurality of segmented portions.

6. The method as recited in claim 1, further comprising:
    with the one or more special purpose computing devices, training at least one of the one or more machine learned models based, at least in part, on editorial input for a sample set of segmented portions.

7. The method as recited in claim 1, wherein at least one of the one or more machine learned models operates in an unsupervised mode.

8. The method as recited in claim 7, wherein the one or more machine learned models operating in an unsupervised mode identifies one or more digital signals representing a vector space representation as one of the feature properties.

9. The method a recited in claim 1, wherein at least one of the plurality of segmented portions comprises one or more digital signals representing at least one document object model (DOM) node.

10. The method as recited in claim 1, further comprising:
with the one or more special purpose computing devices:
accessing the one or more files for the at least one of the plurality of displayable web pages from the memory; and
identifying one or more digital signals representing the plurality of segmented portions based, at least in part, on an initial set of properties identifiable in one or more digital signals representing the at least one file.

11. An apparatus comprising:
a memory having stored therein one or more digital signals to represent at least one file for a particular displayable web page to comprise at least two of a plurality of segmented portions;
at least one processing unit coupled to the memory and programmed with instructions to:
access the plurality of segmented portions of the at least one displayable web page, and use one or more machine learned models to:
identify one or more feature properties of the plurality of segmented portions within the one or more files, or otherwise to be inferable from the one or more files,
classify the at least two of the plurality of segmented portions as at least one of a plurality of segment types to be based, at least in part, on the one or more feature properties to be identified, the one or more feature properties to be identified are to comprise at least language feature properties of language model of content to be displayed in one or more of the at least two of the plurality of segmented portions, and
determine content quality scores for at least two of the plurality of segmented portions of at least the particular displayable web page; and
establish an index in the memory, the index to be established for the plurality of segmented portions and to be based, at least in part, on the segment type, the index to indicate the content quality scores.

12. The apparatus as recited in claim 11, wherein the at least one processing unit is to be programmed with instructions to establish segmented portion key-value content for at least one of the one or more machine learned models, for the at least one of the plurality of segmented portions, and to index the at least one of the plurality of segmented portions to be based, at least in part, on at least a portion of the segmented portion key-value content.

13. The apparatus as recited in claim 11, wherein the at least one processing unit is to be programmed with instructions to combine the at least two of the plurality of segmented portions into a single segmented portion to be based, at least in part, on at least one feature for the two or more of the plurality of segmented portions.

14. The apparatus as recited in claim 11, wherein at least one of the one or more machine learned models is to operate in an unsupervised mode and is to identify one or more digital signals to represent a vector space representation as one of the feature properties.

15. The apparatus as recited in claim 11, wherein the at least one processing unit is to be programmed with instructions to identify the plurality of segmented portions to be based, at least in part, on an initial set of properties to be identifiable in the at least one file.

16. An article comprising:
a non-transitory computer readable medium having computer implementable instructions stored thereon to be implemented by one or more processing units in a computing device to transform the computing device into a special purpose device to:
access a plurality of segmented portions of at least one of a plurality of web pages to be displayable by one or more digital signals of one or more files stored in a memory, wherein a particular web page of the plurality of web pages is to comprise at least two of the plurality of segmented portions;
use one or more machine learned models to:
identify one or more feature properties of the plurality of segmented portions within the one or more files, or otherwise to be inferable from the one or more files,
classify the at least two of the plurality of segmented portions as at least one of a plurality of segment types to be based, at least in part, on the one or more identified feature properties, the one or more feature properties to be identified are to comprise at least language feature properties of language model of content to be displayed in one or more of the at least two of the plurality of segmented portions, and
determine content quality scores for at least two of the plurality of segmented portions of at least the particular web page; and
establish one or more digital signals to represent an index within a memory to be coupled to the one or more processing units, the index to be established for the plurality of segmented portions and to be based, at least in part, on the segment type, the index to indicate the content quality scores.

17. The article as recited in claim 16, wherein the computer implementable instructions to be implemented by the one or more processing units in the computing device are to operatively transform the computing device into the special purpose device to establish one or more digital signals to represent segmented portion key-value content for at least one of the one or more machine learned models, for the at least one of the plurality of segmented portions, and to index at least one of the plurality of segmented portions to be based, at least in part, on at least a portion of the segmented portion key-value content.

18. The article as recited in claim 16, wherein the computer implementable instructions to be implemented by the one or more processing units in the computing device are to operatively transform the computing device into the special purpose device to combine the at least two of the plurality of segmented portions into a single segmented portion to be based, at least in part, on at least one feature for the two or more of the plurality of segmented portions.

19. The article as recited in claim 16, wherein at least one of the one or more machine learned models is to operate in an unsupervised mode and is to identify one or more digital signals to represent a vector space representation as one of the feature properties.

20. The article as recited in claim 16, wherein the computer implementable instructions to be implemented by the one or more processing units in the computing device are to operatively transform the computing device into the special purpose device to identify the plurality of segmented portions to be based, at least in part, on one or more digital signals to represent an initial set of properties to be identifiable in the at least one file.

* * * * *